(12) United States Patent
Liu et al.

(10) Patent No.: US 11,450,221 B2
(45) Date of Patent: Sep. 20, 2022

(54) CURRICULUM OPTIMISATION METHOD, APPARATUS, AND SYSTEM

(71) Applicant: BEIJING YIZHEN XUESI EDUCATION TECHNOLOGY CO., LTD, Beijing (CN)

(72) Inventors: Huijun Liu, Beijing (CN); Hao Yao, Beijing (CN); Guiyong Sun, Beijing (CN)

(73) Assignee: BEIJING YIZHEN XUESI EDUCATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/624,330

(22) PCT Filed: Jul. 2, 2020

(86) PCT No.: PCT/CN2020/099892
§ 371 (c)(1),
(2) Date: Dec. 31, 2021

(87) PCT Pub. No.: WO2021/000909
PCT Pub. Date: Jan. 7, 2021

(65) Prior Publication Data
US 2022/0208014 A1 Jun. 30, 2022

(30) Foreign Application Priority Data
Jul. 3, 2019 (CN) .......................... 201910594625.8

(51) Int. Cl.
*G06V 10/762* (2022.01)
*G09B 5/06* (2006.01)
(Continued)

(52) U.S. Cl.
CPC .......... *G09B 5/065* (2013.01); *G06F 16/738* (2019.01); *G06V 10/762* (2022.01); *G06V 20/41* (2022.01);
(Continued)

(58) Field of Classification Search
None
See application file for complete search history.

(56) References Cited

U.S. PATENT DOCUMENTS

2014/0377732 A1\* 12/2014 Freedman ................ G09B 5/02
434/365
2016/0364115 A1\* 12/2016 Joung ..................... G06T 11/60
(Continued)

FOREIGN PATENT DOCUMENTS

CN 104484420 A 4/2015
CN 105117467 A 12/2015
(Continued)

OTHER PUBLICATIONS

International Searching Authority, International Search Report, mailed in relationship to International Application No. PCT/CN2020/099892, dated Sep. 24, 2020 (7 pages).
(Continued)

*Primary Examiner* — Eileen M Adams
(74) *Attorney, Agent, or Firm* — Polsinelli PC; Derek D. Donahoe

(57) ABSTRACT

A curriculum optimisation method, apparatus, and system are provided. The method at least includes: collecting lecture information, the lecture information includes a lecture video; performing knowledge point recognition on the lecture video to obtain knowledge point information; segmenting the lecture video according to the knowledge point information; evaluating the lecture video segmented to obtain an optimum video of each of knowledge points; and
(Continued)

making courseware according to structural information corresponding to the optimum video of each of the knowledge points, to obtain optimized courseware.

12 Claims, 6 Drawing Sheets

(51) Int. Cl.
    *G06V 20/40* (2022.01)
    *G06F 16/738* (2019.01)
    *G06V 20/62* (2022.01)
    *G10L 25/57* (2013.01)
    *G10L 15/26* (2006.01)
    *G06F 40/20* (2020.01)
    *G10L 15/22* (2006.01)

(52) U.S. Cl.
    CPC .............. *G06V 20/49* (2022.01); *G06V 20/62* (2022.01); *G06F 40/20* (2020.01); *G10L 15/22* (2013.01); *G10L 15/26* (2013.01); *G10L 25/57* (2013.01)

(56) References Cited

U.S. PATENT DOCUMENTS

2017/0011642 A1   1/2017  Wang et al.
2018/0293912 A1*  10/2018  Ni ........................... G09B 5/065

FOREIGN PATENT DOCUMENTS

| | | |
|---|---|---|
| CN | 105810024 A | 7/2016 |
| CN | 106878632 A | 6/2017 |
| CN | 206400819 U | 8/2017 |
| CN | 107968959 A | 4/2018 |
| CN | 108280153 A | 7/2018 |
| CN | 109274913 A | 1/2019 |
| CN | 109389870 A | 2/2019 |
| CN | 109460488 A | 3/2019 |
| CN | 110322738 A | 10/2019 |

OTHER PUBLICATIONS

China National Intellectual Property Office, First Office Action, mailed in relationship to Chinese Application No. 201910594625.8, dated Aug. 31, 2020 (21 pages).

China National Intellectual Property Office, Second Office Action, mailed in relationship to Chinese Application No. 201910594625.8, dated Dec. 1, 2020 (20 pages).

China National Intellectual Property Office, Notification to Grant Patent right for Invention, mailed in relationship to Chinese Application No. 201910594625.8, dated Mar. 25, 2021 (3 pages).

* cited by examiner

S310

S400

CURRICULUM OPTIMISATION METHOD, APPARATUS, AND SYSTEM

The present disclosure a National Stage application of PCT international application No. PCT/CN2020/099892, filed on Jul. 2, 2020, which claims priority to Chinese Patent Application No. 201910594625.8, filed with the Chinese Patent Office on Jul. 3, 2019 and entitled "CURRICULUM OPTIMISATION METHOD, APPARATUS, AND SYSTEM", both of which are incorporated herein by reference in their entireties.

TECHNICAL FIELD

The present disclosure relates to the field of computers and mobile Internet, and more particularly, to a curriculum optimisation method, apparatus, and system.

BACKGROUND

In the teaching scene of a dual-teacher classroom, there is a leading teacher who teaches remotely through live broadcast, and in the actual classroom, there is an assistant teacher who cooperates with the leading teacher to provide teaching assistance to students in the classroom. The leading teacher teaches through a teaching system, and the assistant teacher conducts teaching assistance also through the teaching system. The teaching system can be, for example, a future blackboard system developed by Tomorrow Advancing Life Company.

In the actual teaching scene, the leading teacher needs to prepare lessons before starting the class. Planning is needed in the process of preparing lessons. For example, a certain knowledge point can be explained clearly through a few pages of courseware, or several interactive communications with the children in the classroom need to be initiated in the class. For a time taken by each link such as a knowledge point, an interactive communication, etc., the leading teacher will estimate an approximate time when preparing lessons. However, the estimated time is often inaccurate, and during the teaching process, the leading teacher does not have an accurate reference standard for the progress of the teaching, such as when and where the teaching should proceed. In other words, for a certain knowledge point, there is no uniform standard for measuring how many courseware pages the leading teacher should use and how long the leading teacher should take to explain.

During the live broadcast, the leading teacher will teach according to a pre-made courseware. The courseware is pre-configured with multiple knowledge points, multiple interactive activities, and the teaching duration and the number of teaching pages required by each of the knowledge points and the interactive activities. The leading teacher will teach according to the knowledge points, the interactive activities, and the duration and the number of pages configured for them. However, whether the knowledge points, the interactive activities, and the duration and the number of courseware pages pre-configured for them, etc., are appropriate, for example, for a certain knowledge point, whether an explanation with a predetermined duration is sufficient for the students to understand the knowledge point, or for a certain knowledge point, whether the predetermined duration thereof is too long, the leading/assistant teacher may have a subjective feeling, for example, the teaching duration of the certain knowledge point is too long, but the leading/assistant teacher cannot quantify the teaching duration of the certain knowledge point, for example, it is impossible to directly determine the extent to which the predetermined duration is too long or too short, i.e., it is impossible to directly determine the optimum teaching duration and the optimum number of teaching pages for the certain knowledge point.

SUMMARY

In order to solve the above problem, the present disclosure provides a curriculum optimisation method, including operations of:

collecting lecture information, and the lecture information includes a lecture video;

performing knowledge point recognition on the lecture video to obtain knowledge point information;

segmenting the lecture video according to the knowledge point information;

evaluating the lecture video segmented to obtain an optimum video of each of knowledge points; and making courseware according to structural information corresponding to the optimum video of each of the knowledge points, to obtain optimized courseware.

In another aspect, the present disclosure provides a curriculum optimisation system, including a memory and a processor; the memory stores instructions, and the processor is configured for, according to the instructions stored in the memory, performing operations of:

collecting lecture information; the lecture information includes a lecture video;

performing knowledge point recognition on the lecture video to obtain knowledge point information;

segmenting the lecture video according to the knowledge point information;

evaluating the lecture video segmented to obtain an optimum video of each of knowledge points; and making courseware according to structural information corresponding to the optimum video of each of the knowledge points, to obtain optimized courseware.

BRIEF DESCRIPTION OF THE DRAWINGS

In order to explain the technical solutions of the embodiments of the present disclosure more clearly, the following will briefly introduce the drawings used in the description of the embodiments. Obviously, the drawings in the following description are only some embodiments of the present disclosure. Those of ordinary skill in the art can obtain other drawings from these drawings without inventive work.

DETAILED DESCRIPTION

Figure 1:
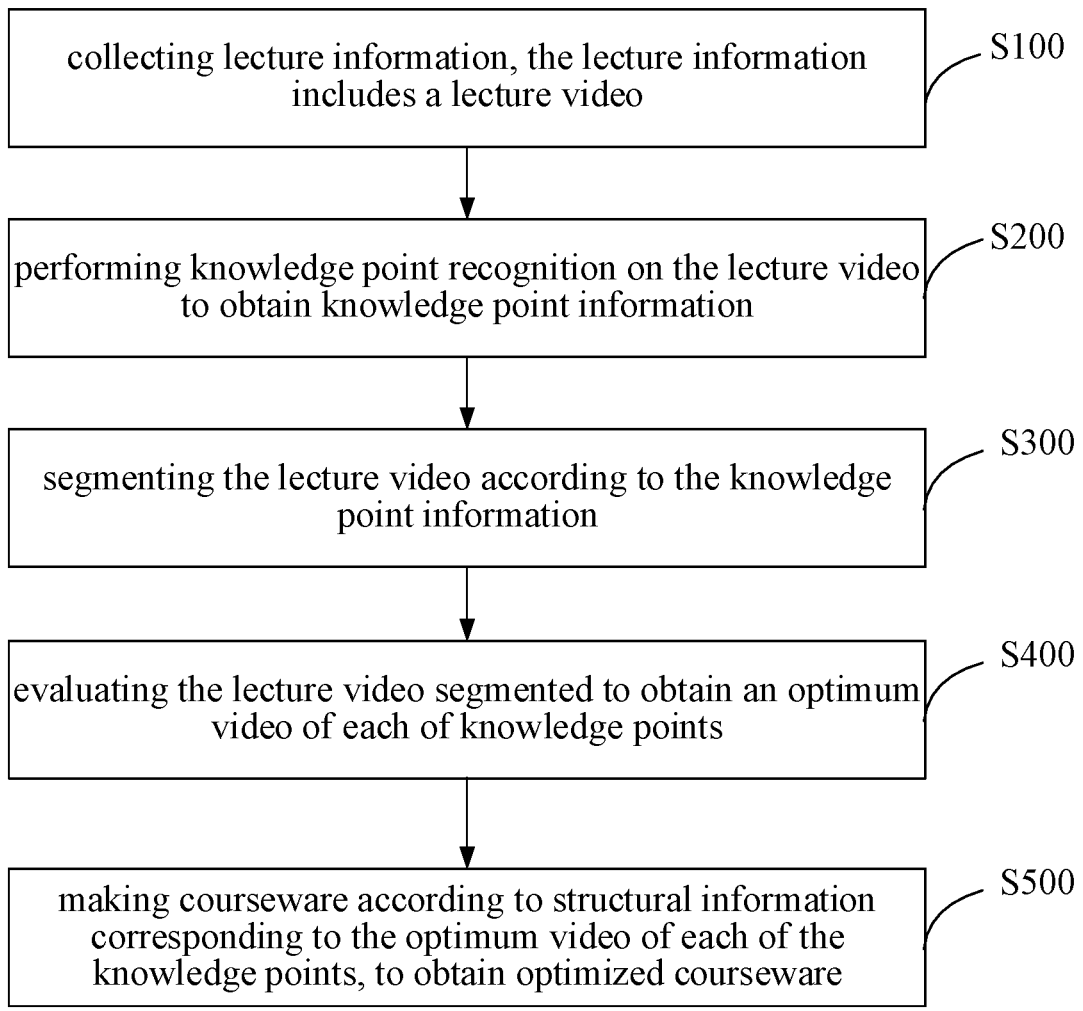
FIG. 1 is a flowchart of a curriculum optimisation method according to the present disclosure.

The technical solutions in the embodiments of the present disclosure will be clearly and completely described with reference to the drawings and in conjunction with the embodiments below. Obviously, the described embodiments are only some of the embodiments of the present disclosure, rather than all of the embodiments. Based on the embodiments of the present disclosure, all other embodiments obtained by those of ordinary skill in the art without inventive work shall fall within the protection scope of the present disclosure.

Before introducing the embodiments of the present disclosure, a system architecture involved in the present disclosure is firstly introduced. The system architecture includes a server and multiple clients. The multiple clients communicate with the server. The multiple clients can be any terminal devices, including any terminal devices such as mobile phones, tablet computers, notebook computers, PCs, Personal Digital Assistants (PDAs), and in-vehicle computers, which are not specifically limited here. An operating system of the terminal device can be a Windows series operating system, a Unix-type operating system, a Linux-type operating system, a Mac operating system, an ANDROID-type operating system, etc., which are not specifically limited here.

In the actual teaching scene of a dual-teacher classroom, a leading teacher teaches remotely through live broadcast, and in the actual classroom an assistant teacher cooperates with the live broadcast teaching of the leading teacher to provide teaching assistance to students in the classroom. The leading teacher teaches through a teaching system, and the assistant teacher conducts teaching assistance also through the teaching system. The teaching system can be, for example, a future blackboard system developed by Tomorrow Advancing Life Company.

During the live broadcast, the leading teacher will teach according to courseware. The courseware is pre-made according to configuration information, which is configured by the leading teacher according to information such as class hours, the number of knowledge points, the difficulty of each of the knowledge points. The configuration information includes the number of courseware pages and the estimated teaching duration of each knowledge point, the interactive activity duration, and the explanation duration and the rest duration, etc. Whether the configuration information of the courseware is appropriate, for example, whether the number of courseware pages and the estimated teaching duration configured for a certain knowledge point are sufficient to explain the knowledge point clearly, or for a certain knowledge point, whether the number of courseware pages configured for it is too many or the estimated teaching duration configured for it is too long, the leading/assistant teacher may have a subjective feeling, for example, the teaching duration configured for a certain knowledge point is not enough for the students to fully understand it, but the leading/assistant teacher cannot quantify the difference between the configuration information and the actual teaching needs, for example, it is impossible to directly determine how much longer or shorter the estimated teaching duration configured for a certain knowledge point is than the actual teaching duration required, i.e., the leading/assistant teacher cannot directly determine the optimum configuration information of the courseware.

In order to solve this problem, the present disclosure provides a curriculum optimisation method and system. The lecture videos adopted by teachers are segmented according to knowledge points, and multiple segmented videos are classified according to knowledge points. User evaluation is introduced through user scoring, click weighting, etc., to obtain the optimum video of each type of knowledge point. Then, data integration is performed on the optimum video of each knowledge point to obtain optimum configuration information of each type of knowledge point, and the courseware is made according to the optimum configuration information, such that a better teaching effect can be obtained.

FIG. 1 illustrates a curriculum optimisation method according to an embodiment of the present disclosure, which can be executed by a processor. The method may include the following operations.

At block S100, lecture information is collected, and the lecture information includes a lecture video.

At block S200, knowledge point recognition is performed on the lecture video to obtain knowledge point information.

At block S300, the lecture video is segmented according to the knowledge point information.

At block S400, the lecture video segmented is evaluated to obtain an optimum video of each of knowledge points.

At block S500, courseware is made according to structural information corresponding to the optimum video of each of the knowledge points, to obtain optimized courseware.

The specific implementation of operations S100-S500 of the curriculum optimisation method will be described in detail below.

At block S100, the lecture information is collected to obtain courseware configuration information, real-time usage information, and lecture video information.

Figure 2:
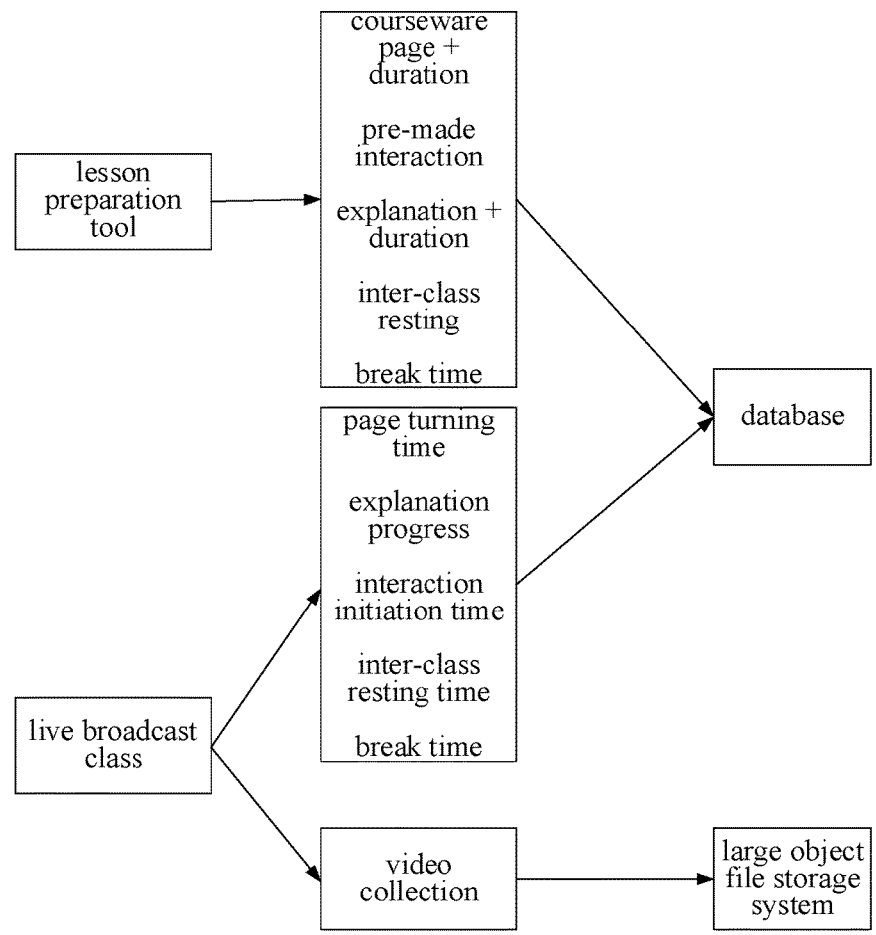
FIG. 2 illustrates data information collected by a lecture information collection unit.

Before optimizing the curriculum, it is necessary to obtain the existing lecture information first. In the present disclosure, the lecture information is collected through a lecture information collection unit. The lecture information includes the configuration information used by the teacher when making courseware before teaching, the real-time usage information on teaching of the leading/assistant teacher during the teaching process, and the video information of the live broadcast curriculum. FIG. 2 illustrates data information collected by the lecture information collection unit.

Before teaching, the leading teacher makes courseware in advance according to the configuration information. The courseware is pre-made according to the configuration information. The configuration information is configured by the leading teacher according to the class hours, the number of teaching knowledge points, and the difficulty of each of the knowledge points. As illustrated in FIG. 2, the configuration information includes the number of courseware pages and the estimated teaching duration of each knowledge point, an interactive activity and the estimated duration thereof, an explanation activity and the estimated duration thereof, the inter-class resting duration and the break time. The lecture information collection unit collects the configuration information and stores it in a corresponding database for subsequent use.

In the actual teaching process, the leading/assistant teacher will perform the page turning operation on the courseware or initiate an interactive operation as the teaching progresses. The timing data of the page turning operation or interactive operation reflects the real-time usage information of the current teaching. Therefore, by collecting the timing data during the teaching of the leading/assistant teacher, the real-time usage information during the teaching can be collected.

For real-time usage information during class, data can be reported by a prefabricated node configured on a client, as illustrated in FIG. 2. For example, when the leading teacher is turning a page, a corresponding operation behavior and a corresponding time are reported; and each page has a corresponding time. When the leading/assistant teacher initiates an interaction, his/her behavior and corresponding time are also reported, and the collected data information is stored in the database for subsequent use.

For example, the real-time usage information can be recorded as: the second page of the first knowledge point, at 13-th minute and 50-th second; or the inter-class resting, at 20-th minute and 15-th second; or the second page of a choice question, at 13 minute and 10-th second. The time is exemplified as timekeeping from the beginning of class. Certainly, Beijing time (or other time zone time) can also be used. For example, the timing data can be: the second page of the first knowledge point, at 16:13:50.

The foregoing is only an example of ways to obtain real-time usage information, and does not constitute a limitation to the present disclosure. Other existing technologies can also be used, as long as the function can be realized.

For the video information of the live broadcast curriculum, the whole process of the leading teacher teaching is collected through a camera in a live room. A server collects the real-time data of the teacher's teaching and pushes it to the tutoring classrooms across the country, and saves the full amount of videos on the server side. The collected video information is used for subsequent video segmentation and classification. As illustrated in FIG. 2, the lecture information collection unit also collects the whole process video of the live broadcast explanation, which can be stored in, for example, a large object file storage system.

At block S200, knowledge point recognition is performed on the lecture video to obtain knowledge point information.

After the lecture information is collected by the lecture information collection unit, the lecture video is segmented according to the knowledge points, i.e., each of lecture videos is divided into several video clips according to the knowledge points.

In order to complete the segmentation of the lecture video according to the knowledge points, it is necessary to recognize each of knowledge points from the lecture video. The recognition can, for example, recognize text information in the video by means of OCR (Optical Character Recognition) text recognition, and/or detect different scenes in the video by means of video scene recognition, and/or recognize the voice content of the video by means of voice recognition. After the knowledge points of the lecture video are recognized, the knowledge point information in the lecture video can be obtained, such that the lecture video can be segmented into video clips with knowledge points as units according to the knowledge point information.

When recognizing the lecture video, it is necessary to sample the frames of the lecture video first. The timing of the sampling is preferably based on the real-time usage information during the teaching process. That is, the timing of sampling the frames of the lecture video is selected to be near the time point when the teacher performs the page turning operation on the courseware during the teaching process, at this time point, the courseware has a page turning behavior, i.e., this time point may be the timing to change the knowledge point or to switch the knowledge point with another activity.

Figure 3:
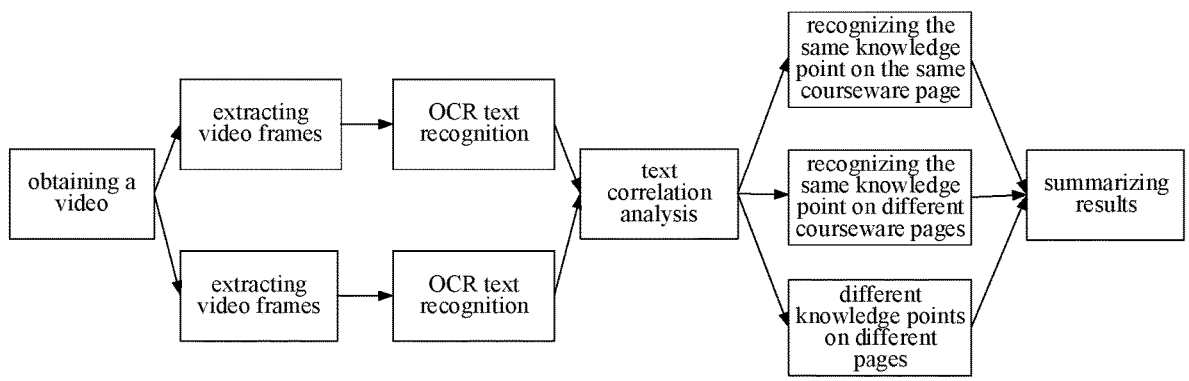
FIG. 3 is a specific manner of recognizing a text content in a video by means of the OCR text recognition.

A specific embodiment of recognizing the text content in a video by means of OCR text recognition is first introduced below. As illustrated in FIG. 3, firstly, the frames of the lecture video are sampled, and OCR text recognition is performed on the sampled video frames, and then correlation analysis is performed on the text results recognized from two adjacent video frames. According to the result of the text correlation analysis, it can be determined whether the knowledge points in two adjacent video frames belong to the same knowledge point. The process of OCR text recognition of knowledge points mainly focuses on three types: (1) knowledge points of the same page of courseware are the same, and the text recognition results are classified as the same knowledge point; (2) different courseware pages of the same knowledge point are classified as the same knowledge point through the text correlation analysis; (3) different knowledge points, or a knowledge point and an interaction, inter-class resting and so on are classified as different knowledge points.

Repeated correlation analysis on the text results of two adjacent video frames in all the extracted video frames can recognize all the knowledge point information in the lecture video, and all the recognized knowledge point information are ranked according to the teaching time, i.e., the video time interval corresponding to a certain knowledge point can be determined. The knowledge point information includes the knowledge point, the video start time of the knowledge point, and the video end time of the knowledge point. Optionally, each piece of knowledge point information can also include a confidence level.

Optionally, the OCR text recognition can also adopt other feasible manners. The OCR text recognition technology belongs to the existing technology in the field and is not specifically limited here.

Figure 4:
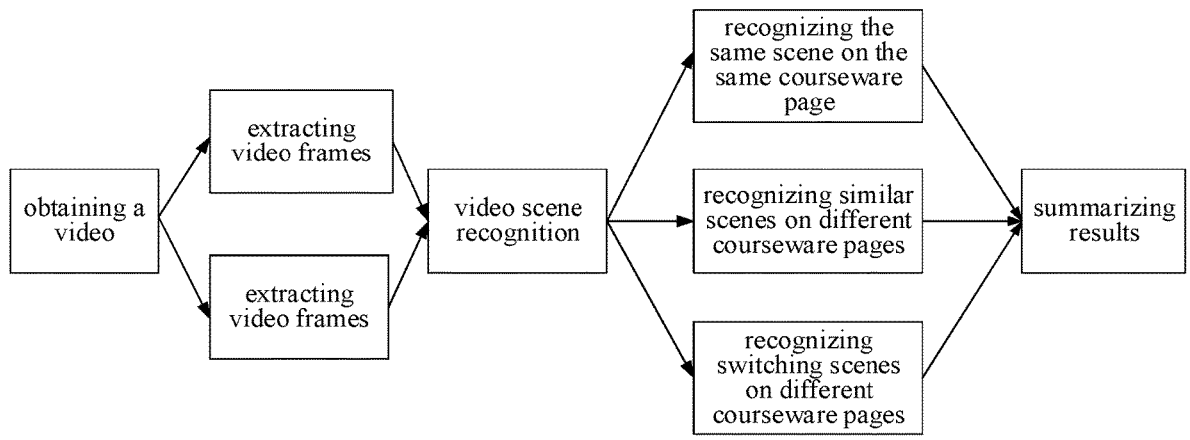
FIG. 4 is a specific manner of recognizing a lecture video by means of the video scene recognition.

When the lecture video is recognized through the video scene recognition manner, as illustrated in FIG. 4, the frames of the lecture video are first sampled, and scene recognition is performed on two adjacent video frames. The timing of the sampling is preferably based on the real-time usage information during the teaching process. That is, the timing of sampling the frames of the lecture video is selected to be near the time point when the teacher performs the page turning operation on the courseware during the teaching process, at this time point, the courseware has a page turning behavior, i.e., this time point may be the timing to change the knowledge point or to switch the knowledge point with another activity.

According to the recognition result of the video scene, it can be recognized that two adjacent courseware pages are the same type of similar courseware pages or different types of courseware pages. The process of video scene recognition on knowledge points mainly focuses on three types: (1) the same page of courseware obviously belongs to the same scene; (2) for different courseware pages of the same knowledge point, since their teaching situations are similar, they are recognized as the same scene; (3) for different knowledge points of different courseware pages, when scene switching is recognized, they are classified into different scenes, for example, the scene where the teacher turns on the curtain or there is inter-class resting is obviously different from the scene of teaching a knowledge point, so they will be recognized as different scenes.

Scene recognition can be repeatedly performed on two adjacent video frames in all the extracted video frames to recognize all the scene information in the lecture video, so as to obtain the boundary line of different scenes. Corresponding to the time axis of the video, the division result in time of the lecture video according to the scene can be obtained. The scene information includes the scene, the video start time of the scene, and the video end time of the scene. Optionally, each piece of scene information can also include a confidence level.

Obviously, the recognized different scenes actually correspond to knowledge points or interactive activities, so knowledge point recognition can also be realized through the video scene recognition.

Optionally, the video scene recognition is performed in a CV (Computer Vision) manner. Certainly, other feasible manners can also be used. The video scene recognition technology belongs to the existing technology in the field and is not specifically limited here.

Figure 5:
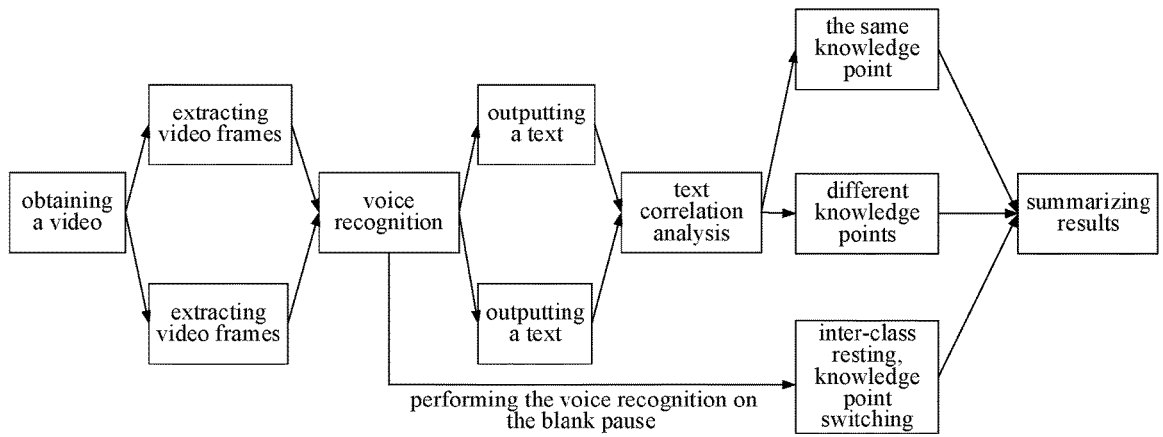
FIG. 5 illustrates a specific manner of recognizing a lecture video by means of the voice recognition.

When recognizing a lecture video through the voice recognition, as illustrated in FIG. 5, firstly, the video voice sequence may be extracted from the lecture video, and then the voice sequence can be recognized to output the corresponding text content, and correlation analysis is performed on the text content.

The timing of extracting the video voice sequence is preferably based on the real-time usage information during the teaching process, i.e., the timing of extracting the video voice sequence for sampling is selected near the time point when the teacher performs page turning operation on the courseware during the teaching process, at this time point, the courseware has a page turning behavior, i.e., this time point may be the timing to change the knowledge point or to switch the knowledge point with another activity.

Because the texts obtained by performing the voice recognition on the teaching of contents of the same knowledge point are similar, through the correlation analysis on the text context, it can be determined that the same knowledge point is being taught in a certain period of time. Therefore, an audio clip corresponding to each knowledge point can be determined by means of the voice recognition. By repeatedly performing correlation analysis on the text results obtained by performing the voice recognition on all the extracted video voice sequences, all the knowledge point information in the lecture video can be recognized, and all the knowledge point information recognized is ranked according to the teaching time, and then the video time interval corresponding to a certain knowledge point can be determined. The knowledge point information includes the knowledge point, the video start time of the knowledge point, and the video end time of the knowledge point. Optionally, each piece of knowledge point information may also include a confidence level.

Meanwhile, when knowledge point switching or inter-class resting is performed during the teacher's teaching process, there will generally be a long voice pause. Therefore, in the process of the voice recognition, by recognizing the long voice pause in the middle of the audio, conditions, such as switching of knowledge points or an interactive activity, etc., can be determined. In this way, different knowledge points can also be recognized.

Optionally, the voice recognition can be performed by LSTM (Long Short-Term Memory) technology. Certainly, other feasible manners can also be used. The voice recognition technology belongs to the existing technology in the field and is not specifically limited here.

It can be seen that, the knowledge point information in the lecture video can be recognized through the OCR, video scene recognition or voice recognition. Certainly, those skilled in the art should understand that the recognition manners for knowledge points in the lecture video are not limited to the above three. There are other recognition manners in the field, as long as they can recognize the knowledge points in the lecture video.

In the actual use process, each recognition manner has its own advantages and disadvantages. In order to more accurately complete the recognition and classification of the knowledge points of the video, a combination of two or more recognition manners can also be selected for recognition. For example, a pairwise combination or a combination of three of the above three recognition manners is used. The combination manners of this embodiment do not constitute a limitation to the present disclosure.

The present disclosure is illustrated in detail by taking the combination of the OCR text recognition, the video scene recognition, and the voice recognition as an example.

In this embodiment, in order to use the three recognition manners in combination, firstly, the advantages and disadvantages of the three recognition manners are compared, as illustrated in Table 1:

TABLE 1

Comparison table of the advantages and disadvantages of the three recognition manners

| Detection Method | Advantage | Disadvantage |
|---|---|---|
| OCR text recognition | the corresponding knowledge point can be obtained explicitly | relatively less information is obtained |
| video scene detection | more obvious scene switching, such as initiating an interaction or inter-class resting, can be well detected | it is insensitive to courseware scene switching of different knowledge points |
| voice recognition | a large amount of information is contained, a large amount of content can be extracted, and a large amount relevant corpus can be provided for judgment | more impurities are contained, and too of many impurities will affect the detection result |

It can be seen that the three recognition manners have their own advantages and disadvantages. Then, an appropriate recognition manner should be selected according to emphases of the advantages and disadvantages of the various recognition manners. For example, different weights can be set for each of the recognition manners. Both the OCR text recognition and the voice recognition can clearly obtain various knowledge points taught by the teacher, but the video scene detection is not sensitive to the switching of knowledge points, and cannot give the corresponding knowledge points; therefore, the weight of the video scene recognition is set to be lowest when used in combination. The leading teacher's courseware itself condenses the essence of the corresponding knowledge points, and some key titles or content fields themselves are the refinement of the knowledge points, which has the highest accuracy in generalizing the content of the knowledge points. Therefore, the weight of the OCR text recognition is set to be highest when used in combination. The voice sequence includes a large amount of voice information, and it is relatively trivial, without refining the central idea, and the corresponding knowledge point cannot be easily summarized, but it is the expression of the teacher's actual explanation rhythm. Therefore, the weight of the voice recognition is set to be slightly less than the weight of the OCR text recognition, when used in combination. In an embodiment, for example, the weights of the three recognition manners may be set as:

the weight of the OCR text recognition (60%)> the weight of the voice recognition (30%)> the weight of the scene detection (10%).

At block S300, the lecture video is segmented according to the knowledge point information.

After recognizing the lecture video through each recognition manner, a set of knowledge point information corresponding to the lecture video will be generated. When two or more recognition manners are used in combination, it is necessary to determine several knowledge point information used for knowledge point segmentation of the lecture video according to the generated two or more sets of knowledge point information, i.e., two or more sets of knowledge point information are segmented to determine a set of knowledge point segmentation information used for segmenting the lecture video. Certainly, each piece of knowledge point segmentation information of the set of knowledge point segmentation information may be obtained by different recognition manners. For example, the first knowledge point segmentation information is obtained by the OCR text recognition, and the second knowledge point segmentation information is obtained by the voice recognition.

In addition, those skilled in the art should understand that, when merely one recognition manner is adopted for knowledge point recognition, it is unnecessary to segment the set of knowledge point information generated. This set of knowledge point information is a set of knowledge point segmentation information used for segmenting the lecture video.

Figure 8:
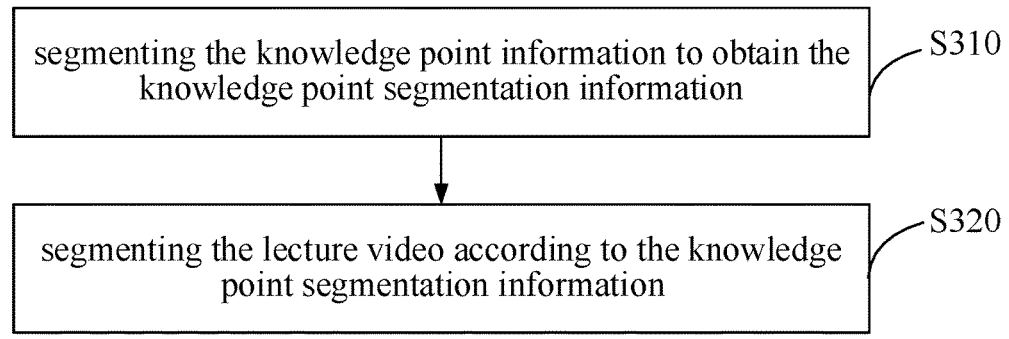
FIG. 8 illustrates a flowchart of processing of the operation S300 in FIG. 1.

FIG. 8 illustrates a flowchart of processing of the operation S300 in FIG. 1. As illustrated in FIG. 8, the operation S300 can include operations S310 and S320.

At block S310, the knowledge point information is segmented to obtain the knowledge point segmentation information.

Figure 6:
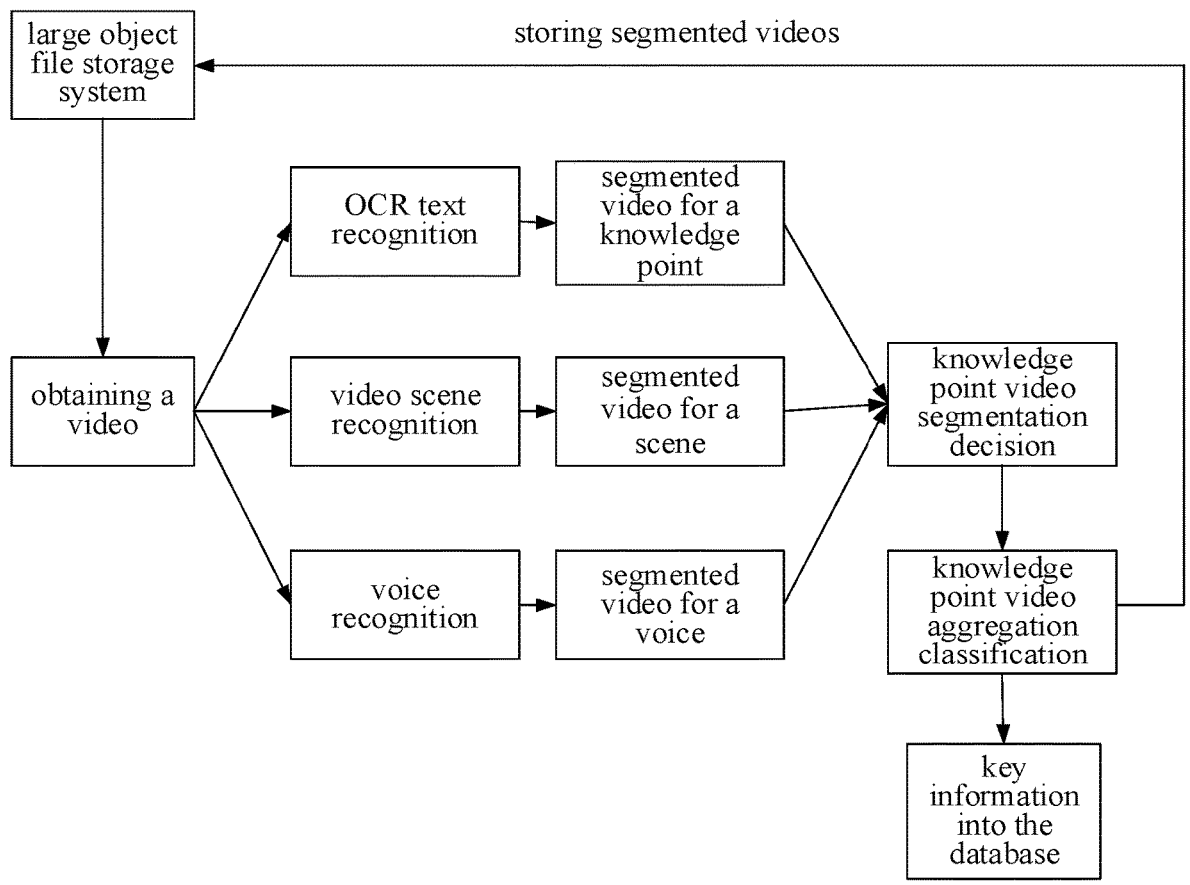
FIG. 6 illustrates a flowchart of using three recognition manners in combination to realize segmentation of a lecture video according to knowledge points.

The segmentation decision of using two or more recognition manners in combination will be described in detail below. Still taking usage of the three manners of the OCR text recognition, the voice recognition, and the video scene recognition in combination as an example, as illustrated in FIG. 6, it illustrates a flowchart of using three recognition manners in combination to realize the knowledge point segmentation of the lecture video. The video segmentation unit generates three sets of knowledge point information/scene information from the lecture video through three manners of the OCR text recognition, the voice recognition, and the video scene recognition, respectively. Each set of knowledge point information/scene information represents all the knowledge points in the lecture video, which may include one or more pieces of knowledge point information/scene information. Each piece of knowledge point information/scene information corresponds to a knowledge point. Each piece of knowledge point information/scene information includes the knowledge point, the video start time of the knowledge point, the video end time of the knowledge point, the confidence level, etc.

Before segmenting, the composition of a set of knowledge point information/scene information obtained by each recognition manner is firstly introduced. As illustrated in Table 2, the knowledge point information generated by the OCR text recognition and the voice recognition includes the knowledge point, the video start time of the knowledge point, the video end time of the knowledge point, and the confidence level. The scene information generated by the video scene recognition includes the scene, the video start time of the scene, the video end time of the scene and the corresponding confidence level.

TABLE 2

| Information recognized by the three recognition manners | |
| --- | --- |
| Detection Manner | Obtained Information |
| OCR text recognition | the knowledge point, the video start time, the video end time, and the confidence level |
| video scene recognition | the scene, the video start time, the video end time, and the confidence level |
| voice recognition | the knowledge point, the video start time, the video end time, and the confidence level |

After three sets of knowledge point information/scene information are generated through three recognition manners, there are three pieces of knowledge point information/scene information obtained through different recognition manners for each knowledge point. By calculating the confidence level in the knowledge point information/scene information and the weight of each recognition manner described above, the credible score for each piece of knowledge point information/scene information can be obtained. The credible scores for three pieces of knowledge point information/scene information corresponding to each knowledge point are ranked, and the knowledge point information/scene information with the highest score is knowledge point segmentation information of the knowledge point. The credible scores for three pieces of knowledge point information/scene information corresponding to each knowledge point in the lecture video are calculated and ranked, and the knowledge point segmentation information of each knowledge point can be obtained. The knowledge point segmentation information forms a set of knowledge point segmentation information, which is used to realize the segmentation of the lecture video according to the knowledge points, and the segmented multiple video clips and the set of knowledge point segmentation information are sent to the database for storage.

Figure 9:
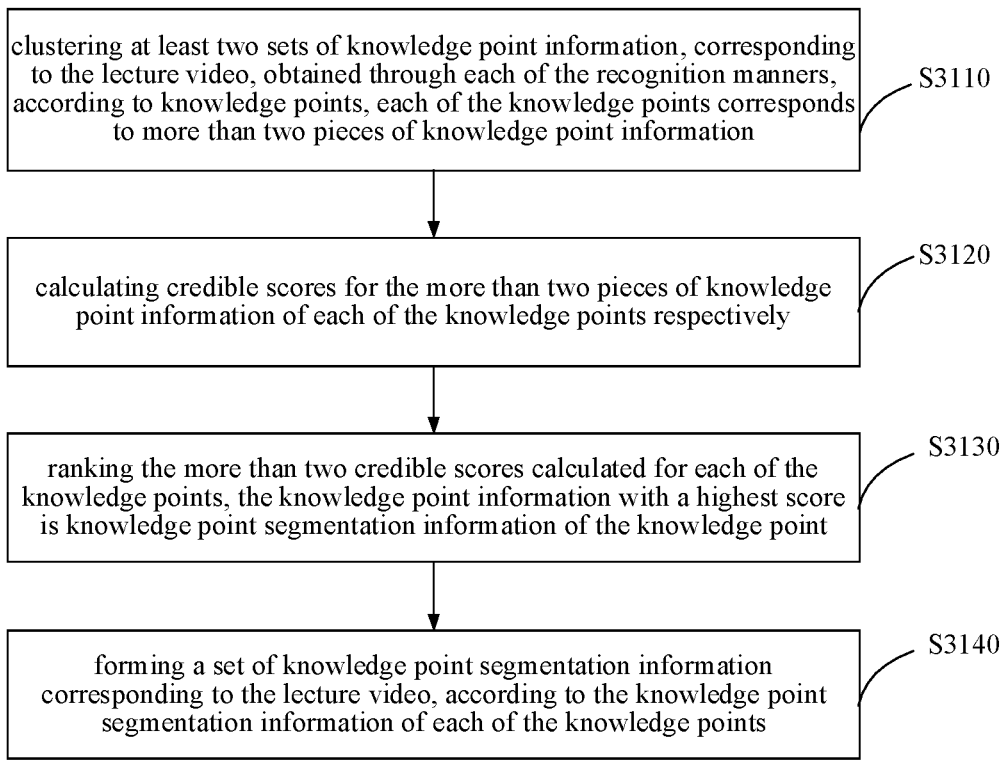
FIG. 9 illustrates a flowchart of processing of the operation S310 in FIG. 8.

FIG. 9 illustrates a flowchart of processing of the operation S310 in FIG. 8. As illustrated in FIG. 9, the operation S310 can include operations S3110 to S3140.

At block S3110, multiple sets of knowledge point information/scene information are clustered according to the knowledge points.

In this embodiment, three sets of knowledge point information/scene information are clustered according to the knowledge points, i.e., for a certain knowledge point, three pieces of knowledge point information/scene information generated by three recognition manners are corresponded, such that each knowledge point has three pieces of knowledge point information/scene information obtained through different recognition manners. In the actual execution process, clustering may be performed according to the video start time and the video end time included in the knowledge point information/scene information, and knowledge point information/scene information with near video start time and video end time can be grouped into one category.

At block S3120, credible scores are calculated for multiple pieces of knowledge point information/scene information of each of the knowledge points respectively.

In this embodiment, the credible score of each piece of knowledge point information/scene information can be calculated by the confidence level in each piece of knowledge point information/scene information and the weight of the corresponding recognition manner. As mentioned above, in an embodiment, the weights of the three recognition manners may be set as: the weight of the OCR text recognition (60%)> the weight of the voice recognition (30%)> the weight of the scene detection (10%). The specific calculation method is:

$$\text{credible score} = \text{confidence level of knowledge point information/scene information} * \text{weight of recognition manner}.$$

At block S3130, multiple credible scores calculated for each of the knowledge points are ranked, and the knowledge point information/scene information with the highest score is the knowledge point segmentation information of the knowledge point.

In this embodiment, the calculated credible scores of the three pieces of knowledge point information/scene information corresponding to each of the knowledge points are ranked, and the knowledge point information/scene information with the highest score is the segmentation information of the knowledge point.

At block S3140, a set of knowledge point segmentation information is formed, according to the knowledge point segmentation information of each of the knowledge points.

In this embodiment, by repeatedly performing operations S3120 and S3130, credible scores for the three pieces of knowledge point information/scene information corresponding to each knowledge point in the lecture video are calculated and ranked, and the knowledge segmentation information of each knowledge point can be obtained. The knowledge point segmentation information forms a set of knowledge point segmentation information, which is used to realize the segmentation of the lecture video according to the knowledge points.

It can be seen that by performing the above operations S3110-S3140, two or more sets of knowledge point information are segmented and a set of knowledge point segmentation information for segmenting the lecture video are determined. This set of knowledge point segmentation information can be used in the following operations to segment the lecture video according to the knowledge points.

Optionally, after the operation S3140, the method can further include: performing time-axis verification on the set of knowledge point segmentation information.

Since each piece of knowledge point information in the set of knowledge point segmentation information may be obtained by different recognition manners, for example, the first knowledge point information is obtained by the OCR text recognition, and the second knowledge point information is obtained by the voice recognition. Thus, it is necessary to verify the video time axis in the set of segmentation information to avoid time overlap of the video clips segmented. When time overlap of video clips overlap is detected, correction may be performed according to the calculation result of the operation S3120. The credible scores corresponding to the two overlapping knowledge point video clips are compared, the knowledge point video clip with the higher score is retained, and the overlapping part is deleted from the knowledge point video clip with the lower score. Alternatively, correction may be performed based on the real-time usage information during the teaching process. Since the real-time usage information during the teaching process reflects the time point when the teacher performs the page turning operation on the courseware in the teaching process, which may be the switching time of knowledge points, so the overlapping video clips can be corrected based on this data.

At block S320, the lecture video is segmented according to the knowledge point segmentation information.

Referring to FIG. 6, through the segmentation decision in the operation S310 illustrated in FIG. 8, a set of knowledge point segmentation information for segmenting the lecture video is obtained. In this operation, the lecture video is segmented into multiple video clips according to the knowledge points according to the set of knowledge point segmentation information, and a unique video ID is assigned to each video clip. The video segmentation method is a well-known technology in the field, and is not specifically limited here.

In combination with the configuration information used when making the courseware obtained in the operation S100 and the real-time usage information during the teaching process as described above, the knowledge point and the number of courseware pages corresponding to each of the video clips can be obtained. Therefore, for each video clip segmented, structural information is generated, and the structured information may include: video ID, knowledge point, video duration, the number of courseware pages, and credible score. As illustrated in the following table:

TABLE 3

| | | Structural information | | |
|---|---|---|---|---|
| knowledge point | video slice ID | video duration | the number of courseware pages | credible score |

After the lecture video is segmented according to the knowledge points, the segmented video clips and the corresponding structural information are stored in the database for subsequent use.

At block S400, the lecture video segmented is evaluated, to obtain an optimum video of each of the knowledge points.

Through the above operations S100-S300, the lecture video can be segmented into multiple video clips according to the knowledge points. By performing the above operations on the lecture videos of multiple teachers in the same subject, the same grade, and the same curriculum, multiple video clips for each of the knowledge points can be obtained.

It is required to know whether the knowledge point structural information presented in each knowledge point video clips is reasonable. Thus, it is necessary to evaluate several video clips of each knowledge point, to determine which video clip has more reasonable structural information for teachers or students, i.e., to determine an optimum video clip of each knowledge point. The present disclosure can evaluate multiple video clips of the same knowledge point by introducing the user evaluation mechanism.

In the embodiments of the present disclosure, the optimum video of each knowledge point is determined mainly according to methods such as video annotation, viewer scoring, click weighting, and the like.

Figure 10:
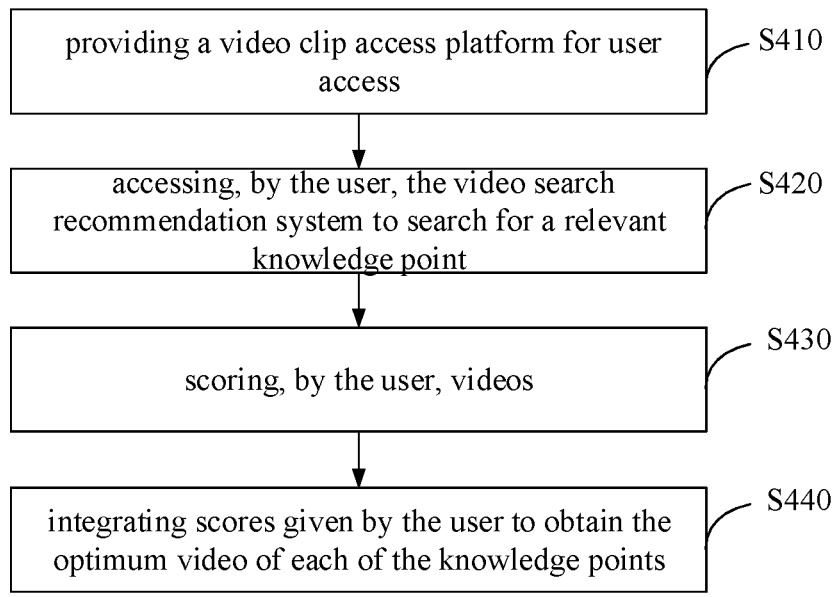
FIG. 10 illustrates a flowchart of processing of the operation S400 in FIG. 1.

FIG. 10 illustrates a flowchart of processing of the operation S400 in FIG. 1. As illustrated in FIG. 10, the operation S400 can include operations S410 to S440.

Figure 7:
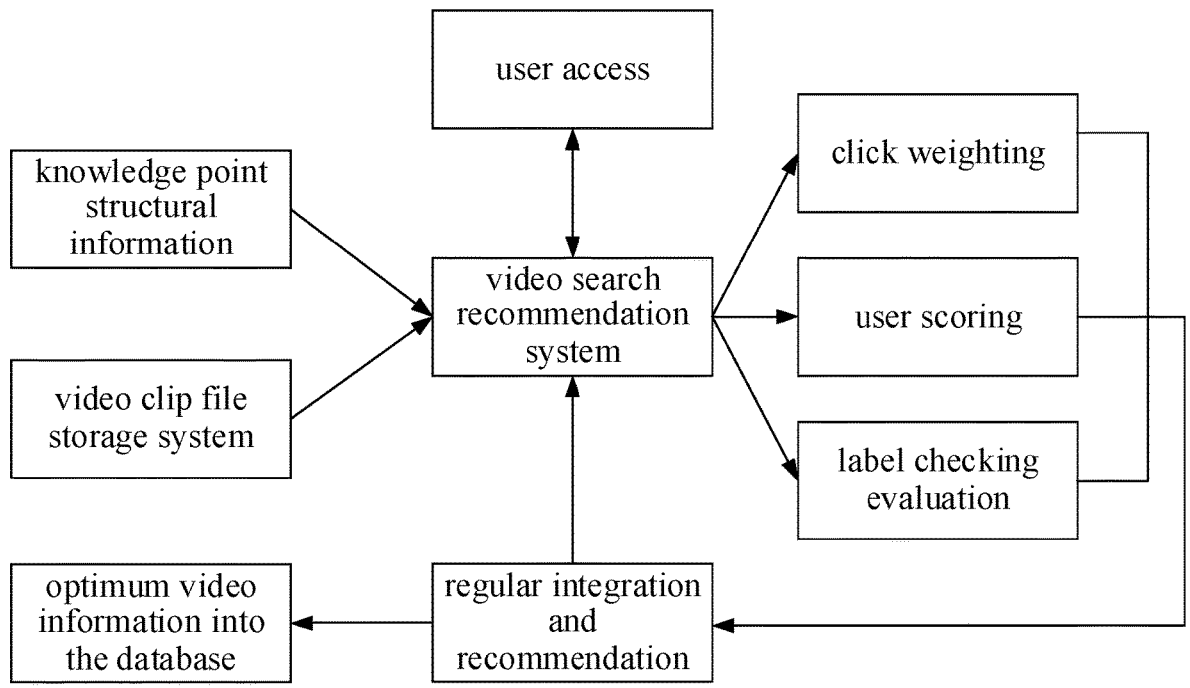
FIG. 7 is a flowchart of determining an optimum video of each knowledge point for multiple video clips of the same knowledge point.

As illustrated in FIG. 7, for multiple video clips of the same knowledge point, the optimum video of each knowledge point can be determined through operations S410 to S440 illustrated in FIG. 10.

At block S410, a video clip access platform is provided for user access.

In the present disclosure, a unified video access platform is externally provided by building a video clip search recommendation system for dual teachers or teachers from other business departments to search and access, and the segmented video clips of the same type of knowledge points are integrated for push.

At block S420, the video search recommendation system is accessed by the user to search for a relevant knowledge point.

The user can search according to the content that he/she is interested in, and the ranking results of the user's search for relevant information can be returned. The initial state can be recalled and ranked according to the resultant score obtained in the video detection system, and then the click weighting operation can be performed on the corresponding video based on the user's click behavior.

The query process of cold data (data queried for the first time or less frequently queried) mainly relies on the credible score in the knowledge point structural data for recalling and ranking. After the user clicks the corresponding recalling and ranking link, the video slice file system is accessed to return the video clip watched.

The query process of hot data (data frequently viewed) for recalling and ranking is based on two parts: (1) the credible score in the knowledge point structural data; (2) the corresponding weight score obtained through regular integration and recommendation. After the user clicks the corresponding recalling and ranking link, the video slice file system is accessed to return the video clip watched.

At block S430, videos are scored by the user.

After the user browses the corresponding knowledge point video, the resultant weight of the corresponding video clip can be increased through the video scoring, label checking evaluation, and determining the weight of the video clip according to the click volume.

After the user has watched the video, the user can score the video, for example, the score can range from 1 star to 5 stars. The corresponding label options can be provided, such as the knowledge point is explained very well, the teacher's teaching is very good, the teacher's teaching is general. The user can click the corresponding label to evaluate.

At block S440, scores given by the user are integrated to obtain the optimum video of each of the knowledge points.

By regularly integrating video clips, of each of the knowledge points, which are frequently clicked, and performing corresponding click weighting, the weights and scores for ranking the video clips can be improved. The score of the video clip may also be increased by summarizing the user scores and weighting. The user's checking evaluations can be summarized for weighting. Finally, the weighting score information of the corresponding knowledge point video can be integrated for use by the search recommendation system.

The regularly integrated data, including the optimum video of the knowledge point, may then be structurally stored in the corresponding database to complete the persistence.

At block S500, the courseware is made according to the configuration information of the optimum video of each of the knowledge points to obtain the optimized courseware.

Through the operation S400, the optimum video of each of the knowledge points can be obtained, and the structural information corresponding to the optimum video can be queried from the database. Therefore, information of the optimum video, such as the knowledge point, the video duration, the number of courseware pages, can be obtained, i.e., the optimum configuration information corresponding to the knowledge point can be obtained. Thus, during the curriculum preparation process, the teacher can be guided to make the courseware by referring to the optimum configuration information for the corresponding knowledge point, such that the optimisation of the curriculum can be realized.

In addition, in the present disclosure, one or more of the courseware configuration information, real-time usage information, and optimum configuration information can also be compared and presented, which is convenient for the teacher to use when optimizing the courseware based on the optimum configuration information, so as to achieve the effect of curriculum optimisation.

Based on the curriculum optimisation method according to the present disclosure, lecture videos broadcasted by multiple teachers are segmented according to knowledge points, and multiple segmented videos are classified according to knowledge points. The optimum video of each knowledge point can be obtained by introducing user feedback such as user scoring, click volume ranking, etc. Then, data integration is performed on the optimum video of each knowledge point to obtain configuration information of the optimum video of each knowledge point, and this configuration information is used as optimum configuration information. By performing teaching configuration according to the optimum configuration information, better teaching effect can be obtained.

The second embodiment of the present disclosure also provides a curriculum optimisation apparatus, including:

a lecture information collection unit, configured for collecting lecture information, the lecture information includes a lecture video;

a knowledge point recognition unit, configured for performing knowledge point recognition on the lecture video to obtain knowledge point information;

a video segmentation unit, configured for segmenting the lecture video according to the knowledge point information;

an evaluation unit, configured for evaluating the lecture video segmented to obtain an optimum video of each of knowledge points; and an optimisation unit, configured for making courseware according to structural information corresponding to the optimum video of each of the knowledge points, to obtain optimized courseware.

The third embodiment of the present disclosure also provides a curriculum optimisation system, including a memory and a processor. The memory stores instructions, and the processor is configured for, according to the instructions stored in the memory, performing the following operations as illustrated in FIG. 1.

At block S100, lecture information is collected, and the lecture information includes a lecture video.

At block S200, knowledge point recognition is performed on the lecture video to obtain knowledge point information.

At block S300, the lecture video is segmented according to the knowledge point information.

At block S400, the lecture video segmented is evaluated to obtain an optimum video of each of knowledge points.

At block S500, courseware is made according to structural information corresponding to the optimum video of each of the knowledge points, to obtain optimized courseware.

Obviously, those skilled in the art should understand that various operations of the present disclosure described above can be implemented by a general computing device. They can be concentrated on a single computing device or distributed on a network composed of multiple computing devices. Optionally, they can be implemented with program codes executable by a computing device, such that they can be stored in a storage device for execution by the computing device, or they can be made into individual integrated circuit modules, or multiple modules or operations thereof are made into a single integrated circuit module. In this way, the present disclosure is not limited to any specific combination of hardware and software.

Although the preferred embodiments of the present invention have been described, those skilled in the art can make additional changes and modifications to these embodiments once they learn the basic inventive concept. Therefore, the appended claims are intended to be interpreted as including the preferred embodiments and all changes and modifications falling within the scope of the present disclosure.

Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A curriculum optimisation method, comprising at least:
collecting lecture information, wherein the lecture information comprises a lecture video;
performing knowledge point recognition on the lecture video to obtain knowledge point information;
segmenting the lecture video according to the knowledge point information;
evaluating the lecture video segmented to obtain an optimum video of each of knowledge points; and
making courseware according to structural information corresponding to the optimum video of each of the knowledge points, to obtain optimized courseware;
wherein the segmenting the lecture video according to the knowledge point information, comprises:
segmenting the knowledge point information to obtain knowledge point segmentation information; and
segmenting the lecture video according to the knowledge point segmentation information;
wherein in a case where more than two recognition manners are used to perform the knowledge point recognition, the segmenting the knowledge point information to obtain the knowledge point segmentation information, comprises:
clustering at least two sets of knowledge point information, corresponding to the lecture video, obtained through each of the recognition manners, according to knowledge points, wherein each of the knowledge points corresponds to more than two pieces of knowledge point information;
calculating credible scores for the more than two pieces of knowledge point information of each of the knowledge points respectively;
ranking the more than two credible scores calculated for each of the knowledge points, wherein the knowledge point information with a highest score is knowledge point segmentation information of the knowledge point; and
obtaining the knowledge point segmentation information of each of the knowledge points according to operations of calculating the credible scores for the more than two pieces of knowledge point information of each of the knowledge points respectively and ranking the more than two credible scores calculated for each of the knowledge points, and forming a set of knowledge point segmentation information corresponding to the lecture video.

2. The method of claim 1, wherein the performing the knowledge point recognition on the lecture video, comprises:
performing the knowledge point recognition by using at least one recognition manner, wherein in a case where more than two recognition manners are used, weights of each recognition manner are different.

3. The method of claim 1, wherein the performing the knowledge point recognition on the lecture video, comprises:
performing knowledge point recognition by using at least one of OCR text recognition, video scene recognition, and voice recognition.

4. The method of claim 1, wherein the knowledge point information comprises: a knowledge point, a video start time of the knowledge point, a video end time of the knowledge point, and a confidence level.

5. The method of claim 1, wherein the lecture information further comprises real-time usage information, and
before the knowledge point recognition is performed on the lecture video, frames of the lecture video are sampled or a video voice sequence is extracted from the lecture video first, wherein timings of the sampling or extracting the video voice sequence are based on the real-time usage information.

6. The method of claim 1, wherein after obtaining the knowledge point segmentation information of each of the knowledge points according to operations of calculating the credible scores for the more than two pieces of knowledge point information of each of the knowledge points respectively and ranking the more than two credible scores calculated for each of the knowledge points, and forming the set of knowledge point segmentation information corresponding to the lecture video, according to the knowledge point segmentation information of each of the knowledge points, the method further comprises:
performing time-axis verification on the set of knowledge point segmentation information.

7. The method of claim 1, wherein the credible score is calculated by:
credible score=weight of recognition manner* confidence level of knowledge point information.

8. The method of claim 1, wherein the segmenting the knowledge point information to obtain the knowledge point segmentation information, comprises:
not segmenting the knowledge point information in a case where only one recognition manner is used to perform the knowledge point recognition, wherein the knowledge point information is the knowledge point segmentation information for segmenting the lecture video.

9. The method of claim 1, wherein the structural information comprises: a video ID, a knowledge point, a video duration, the number of pages of the courseware, and a credible score.

10. The method of claim 1, wherein the evaluating the lecture video segmented to obtain the optimum video of each of the knowledge points, comprises:
providing a video clip access platform for user access;
accessing, by the user, a video search recommendation system to search for a relevant knowledge point;
scoring, by the user, videos; and
integrating scores given by the user to obtain the optimum video of each of the knowledge points.

11. A curriculum optimisation apparatus, comprising:
a lecture information collection unit, configured for collecting lecture information, wherein the lecture information comprises a lecture video;

a knowledge point recognition unit, configured for performing knowledge point recognition on the lecture video to obtain knowledge point information;

a video segmentation unit, configured for segmenting the lecture video according to the knowledge point information;

an evaluation unit, configured for evaluating the lecture video segmented to obtain an optimum video of each of knowledge points; and an optimisation unit, configured for making courseware according to structural information corresponding to the optimum video of each of the knowledge points, to obtain optimized courseware;

wherein the video segmentation unit is configured for segmenting the lecture video according to the knowledge point information, and the segmenting the lecture video according to the knowledge point information, specifically comprises:

segmenting the knowledge point information to obtain knowledge point segmentation information; and segmenting the lecture video according to the knowledge point segmentation information;

wherein the segmenting the knowledge point information to obtain the knowledge point segmentation information, specifically comprises:

clustering at least two sets of knowledge point information, corresponding to the lecture video, obtained through each of the recognition manners, according to knowledge points, wherein each of the knowledge points corresponds to more than two pieces of knowledge point information;

calculating credible scores for the more than two pieces of knowledge point information of each of the knowledge points respectively;

ranking the more than two credible scores calculated for each of the knowledge points, wherein the knowledge point information with a highest score is knowledge point segmentation information of the knowledge point; and obtaining the knowledge point segmentation information of each of the knowledge points, and forming a set of knowledge point segmentation information corresponding to the lecture video.

12. A curriculum optimisation system, comprising a memory and a processor, wherein the memory stores instructions, and the processor is configured for, according to the instructions stored in the memory, performing operations of:

collecting lecture information, wherein the lecture information comprises a lecture video;

performing knowledge point recognition on the lecture video to obtain knowledge point information;

segmenting the lecture video according to the knowledge point information;

evaluating the lecture video segmented to obtain an optimum video of each of knowledge points; and making courseware according to structural information corresponding to the optimum video of each of the knowledge points, to obtain optimized courseware;

wherein the segmenting the lecture video according to the knowledge point information, comprises:

segmenting the knowledge point information to obtain knowledge point segmentation information; and segmenting the lecture video according to the knowledge point segmentation information;

wherein in a case where more than two recognition manners are used to perform the knowledge point recognition, the segmenting the knowledge point information to obtain the knowledge point segmentation information, comprises:

clustering at least two sets of knowledge point information, corresponding to the lecture video, obtained through each of the recognition manners, according to knowledge points, wherein each of the knowledge points corresponds to more than two pieces of knowledge point information;

calculating credible scores for the more than two pieces of knowledge point information of each of the knowledge points respectively;

ranking the more than two credible scores calculated for each of the knowledge points, wherein the knowledge point information with a highest score is knowledge point segmentation information of the knowledge point; and obtaining the knowledge point segmentation information of each of the knowledge points according to operations of calculating the credible scores for the more than two pieces of knowledge point information of each of the knowledge points respectively and ranking the more than two credible scores calculated for each of the knowledge points, and forming a set of knowledge point segmentation information corresponding to the lecture video.

* * * * *